United States Patent
Wood et al.

(10) Patent No.: US 8,819,553 B2
(45) Date of Patent: Aug. 26, 2014

(54) GENERATING A PLAYLIST USING METADATA TAGS

(75) Inventors: Policarpo Wood, Cupertino, CA (US); Eric James Hope, Cupertino, CA (US); William Bull, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 697 days.

(21) Appl. No.: 12/215,091

(22) Filed: Jun. 24, 2008

(65) Prior Publication Data

US 2009/0063976 A1   Mar. 5, 2009

Related U.S. Application Data

(60) Provisional application No. 60/967,460, filed on Sep. 4, 2007.

(51) Int. Cl.
*G06F 3/00* (2006.01)

(52) U.S. Cl.
USPC .................. 715/716; 725/28; 725/38; 558/2; 558/3

(58) Field of Classification Search
USPC .................. 715/716; 825/28, 38; 558/2, 3
See application file for complete search history.

(56) References Cited

U.S. PATENT DOCUMENTS

| | | | | |
|---|---|---|---|---|
| 6,232,539 | B1 * | 5/2001 | Looney et al. | 84/609 |
| 2004/0236568 | A1 * | 11/2004 | Guillen et al. | 704/201 |
| 2006/0206478 | A1 * | 9/2006 | Glaser et al. | 707/5 |
| 2006/0224260 | A1 * | 10/2006 | Hicken et al. | 700/94 |
| 2007/0008844 | A1 * | 1/2007 | Noma | 369/47.11 |
| 2007/0008847 | A1 * | 1/2007 | Maruyama et al. | 369/47.14 |
| 2007/0174866 | A1 * | 7/2007 | Brown et al. | 725/28 |
| 2007/0208771 | A1 * | 9/2007 | Platt | 707/102 |
| 2008/0162358 | A1 | 7/2008 | Patsiokas et al. | |
| 2009/0055759 | A1 * | 2/2009 | Svendsen | 715/764 |
| 2009/0063975 | A1 | 3/2009 | Bull et al. | |
| 2009/0070370 | A1 | 3/2009 | Cunningham et al. | |
| 2009/0100068 | A1 | 4/2009 | Gauba et al. | |
| 2009/0125609 | A1 | 5/2009 | Wood et al. | |
| 2009/0158155 | A1 | 6/2009 | Quinn et al. | |
| 2009/0326949 | A1 | 12/2009 | Douthitt et al. | |

FOREIGN PATENT DOCUMENTS

WO   2007144030 A1   12/2007

OTHER PUBLICATIONS

Jinjer Simon, iLife '04 in a Snap, p. 203, published by Sams (Apr. 7, 2004).*
Jinjer Simon, iLife '04 in a Snap, published by Sams., published on Apr. 7, 2004.*
AlbumPlayer, Multiple Shuffle Modes (Feb. 7, 2007) http://www.albumplayer.com/Help/Shuffle.htm.*
Michael Miller, Using Microsoft® Windows Media® Player 11 (2006).*

* cited by examiner

*Primary Examiner* — Amy Ng
*Assistant Examiner* — Di Xiao
(74) *Attorney, Agent, or Firm* — Novak Druce Connolly Bove + Quigg LLP (57) ABSTRACT

Systems and methods are provided for on-the-fly playlist shuffling. There can be multiple ways to perform the shuffling. In one instance, the electronic device can organize a new playlist by sorting the media files based on a parameter. In another instance, the electronic device can organize a new playlist by shuffling the media files. In yet another instance, the electronic device can first sort the media files into groups of media files based on a parameter. The electronic device can then shuffle the media files within each group. In this manner, the media files can be randomized but only within each group. In all instances, the current media file can continue to play without any interruption. Finally, the electronic device can sort the media files based on the context of the media file that is currently playing.

14 Claims, 8 Drawing Sheets

GENERATING A PLAYLIST USING METADATA TAGS

CROSS-REFERENCE TO RELATED APPLICATIONS

This application claims priority to Wood et al., U.S. Provisional Patent Application No. 60/967,460, filed Sep. 4, 2007, entitled "Generating a Playlist Using Metadata Tags," the entirety of which is incorporated herein by reference.

BACKGROUND OF THE INVENTION

This invention relates to digital media data players and more particularly to systems, methods, and computer readable media that can be used to dynamically generate random playlists while playing media.

Electronic devices, such as digital media players (e.g., music players and video players), and hybrid devices that combine other functionalities with media playing are used by people every day. These devices are often designed to be able to organize music or other media files into playlists. Various bits of data, such as metadata tags associated with each file, can be used to create playlists.

Metadata tags are one or more bits of data that can be associated with or assigned to a media file. For example, a media file's title and author can be stored as metadata tags, where the media file can be a song, movie, or other media that can be played back and/or viewed by the user. Metadata tags can be assigned by a third party and/or by a user.

For example, a media player, such as an iPod™ available by Apple Inc., of Cupertino, Calif., can allow a user to associate a metadata tag, such as star ratings, to one or more songs in the user's music library. The star ratings can range from one star (lowest rating) to five stars (highest rating). In some embodiments, the media player can automatically create a "My Top Rated" playlist that includes the highest rated songs. In addition, when the user associates a five stars rating to a new song, the media player can automatically add the new song to the "My Top Rated" playlist.

Over the years, many media devices (including CD players and iPods™) have been configured to provide the user with a shuffle option. The shuffle option can cause the media device to create a randomized playlist. When the shuffle option is invoked while the media device is playing a media file in a playlist, the media file would stop playing, and the order of media files in the playlist would be re-organized without regard to the media file that was playing when the shuffle option was selected. In other words, every randomization of a playlist first stops playing the media file, and then begins playing a completely new media file. This can be frustrating when users want to randomize upcoming media in a playlist without stopping the playback of the media file the user is currently listening to and/or watching.

Furthermore, another characteristic of current randomization methods is that once the user randomizes the playlist, it is impossible for the playlist to be detangled back to its original state without stopping the play of the current media file. This "detangling" process is sometimes referred to herein as "unshuffling."

SUMMARY OF THE INVENTION

In accordance with the present invention, systems, methods, computer readable media, and means for providing dynamic playlist shuffling of media files are discussed below.

As referenced herein, the phrase "media file" can include any and all types of data that can be processed into media, such as, musical data (e.g., songs), other audio data, video data, animated data, other moving image data, and/or still image data.

In some embodiments, the present invention can be implemented in an electronic device capable of playing media files. When the electronic device plays a media file, such as, e.g., an audio or video file, the user can choose to create a new playlist by selecting a shuffle option associated with a shuffle command.

In some embodiments, multiple shuffle options can be presented. In response to the user selecting a first shuffle option, the electronic device can organize a new playlist that sorts the media files based on a parameter (e.g., the parameter can include one or more metadata tags). For example, the electronic device can create a new playlist that alphabetically organizes the media files by the titles of the media files.

In response to the user selecting a second shuffle option, the electronic device can organize a new playlist that shuffles the media files. For example, the electronic device can shuffle the media files by the titles of the media files.

A third shuffle option can cause the electronic device to sort media files based on a parameter before shuffling. When this shuffle option is selected, the shuffling can be based on a parameter of the media file that is currently playing. For example, the electronic device can first sort the media files (e.g., songs) based on a parameter (e.g., albums). After sorting the media files based on the parameter, the electronic device can create groups of media files that have the same parameter. The electronic device can then shuffle the media files within each group. For example, songs within each album are shuffled, but songs are played in a per album basis. In other words, when the user selects the third shuffle option, the electronic device can limit the shuffle to media files that share the same parameter.

In all three options, the currently playing media file can continue to play while the playlist is organized into a new playlist. In some embodiments, the currently playing media file can be the first media file in the new playlist.

If the user chooses to continuously select the multiple shuffle options, the electronic device can shuffle the playlist based on the first, second, or third shuffle option. Even in this continuous selecting mode, the electronic device can continue to play the current media file.

The invention therefore advantageously provides systems, methods, computer readable media, and means for, among other things, performing dynamic randomization of a playlist by allowing the currently playing media file to continue playing when a shuffle option is selected. The invention also provides various shuffle options to randomize the playlist.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Conventional electronic devices can allow users to create playlists that include various media files. In addition, the playlists can be formed using metadata tags that are associated with each media file. For example, a playlist can be created that includes top rated songs in a user's music library. However, when a user selects to shuffle a playlist, these devices will stop playing the current media file and begin to play a completely new media file from a newly created playlist. Furthermore, once these conventional electronic devices begin to play media files from a shuffled playlist, these devices do not allow the playlist to be unshuffled without stopping the play of the currently playing media file.

The present invention can include an electronic device that allows a user to select a shuffle option without stopping the currently playing media file. As a result, the electronic device waits for the currently playing media file to end before playing the next media file.

In addition, the electronic device can present different options for the shuffle command. In response to the user selecting a first shuffle option, the electronic device can organize a new playlist that is sorted based on a parameter. As used in the following discussion, the term parameter will be understood to include any suitable metadata tags (e.g., metadata tags associated with albums, titles, artists and genre). In response to the user selecting a second shuffle option, the electronic device can organize a new playlist that can shuffle the media files. In response to the user selecting a third shuffle option, the electronic device can first sort media files based on a parameter before shuffling the media files. In all three options, the currently playing media file can continue to play while the playlist is organized into a new playlist.

Figure 1:
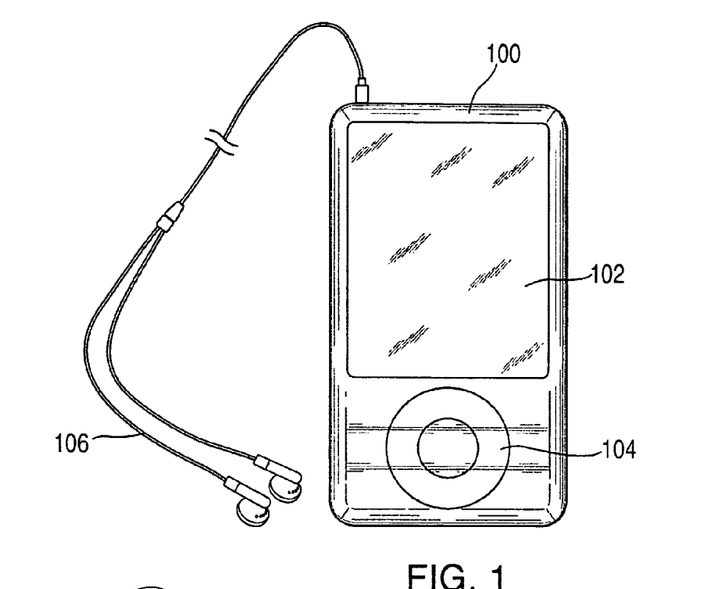
FIG. 1 shows a simplified diagram of an electronic device which can be operated in accordance with one embodiment of the present invention.

FIG. 1 shows a simplified diagram of an electronic device which can be operated in accordance with one embodiment of the present invention. Electronic device 100 can include display component 102, user input component 104, and accessory device 106.

Display component 102 is illustrated in FIG. 1 as a display screen that is integrated into electronic device 100. In some embodiments, display component 102 does not have to be integrated into electronic device 100 and can also be external to electronic device 100. For example, display component 102 can be a computer monitor, television screen, and/or any other graphical user interface, textual user interface, or combination thereof. Display component 102 can enable a user to see images (moving and still) being played back by electronic device 100, display interactive user menus, and/or be used for any other display-related purpose.

User input component 104 is illustrated in FIG. 1 as a click wheel. One skilled in the art would appreciate that user input component 104 could also be any other type of user input component or device, such as, for example, a mouse, keyboard, trackball, slider bar, one or more buttons, electronic device pad, dial, or any combination thereof. User input component 104 can also include a multi-touch screen or other touch-activated component such as that described in Westerman et al., U.S. Pat. No. 6,323,846, issued Nov. 27, 2001, entitled "Method and Apparatus for Integrating Manual Input," which is incorporated by reference herein in its entirety. User input component 104 can emulate a rotary phone or a multi-button electronic device pad, which can be implemented on a touch screen or the combination of a click wheel or other user input device and a screen. A more detailed discussion of such a rotary phone interface can be found, for example, in McKillop et al., U.S. patent application Ser. No. 11/591,752, filed Nov. 1, 2006, entitled "Touch Pad with Symbols based on Mode," which is incorporated by reference herein in its entirety.

Accessory device 106 can be used to facilitate the playing back of audio content and/or the audio portion of video content to the user. Accessory device 106 can be coupled to electronic device 100 using a suitable connector such as a headphone jack. Any suitable audio output device can be used such as, for example, a speaker integrated into electronic device 100, or an external device (such as one or more external speakers). Persons skilled in the art will appreciate that accessory device 106 can also be wirelessly coupled to electronic device 100.

Figure 2:
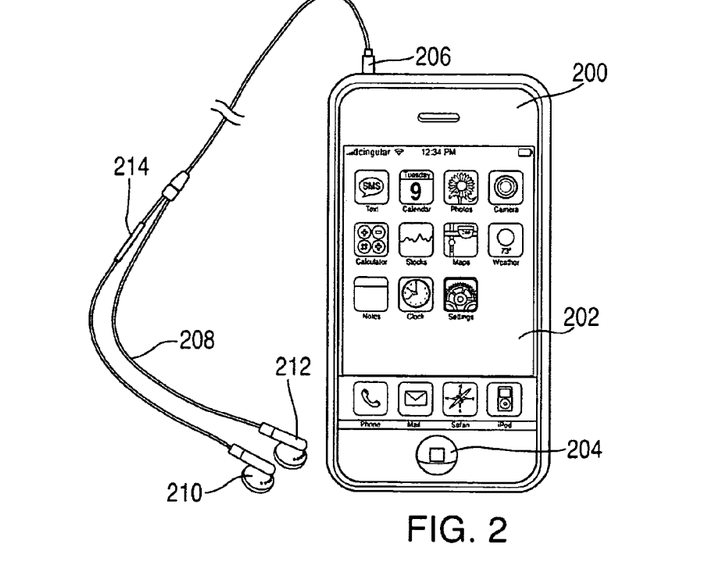
FIG. 2 shows a simplified diagram of an electronic device which can also be operated in accordance with one embodiment of the present invention.

FIG. 2 shows a simplified diagram of an electronic device which can also be operated in accordance with one embodiment of the present invention. Electronic device 200 can be any electronic device, but is show in FIG. 2 as an iPhone™. Electronic device 200 can function as, for example, a portable media player, cellular telephone, personal organizer or any other handheld device. Electronic device 200 can be an electronic device that receives, stores and plays back media files (e.g., audio files, video files, and/or any other type of media files). Electronic device 200 can also function as a communications device that can facilitate telephone calls, send and receive electronic messages (such as, e.g., text and e-mail messages), communicate with satellites (to, e.g., provide driving directions, radio programming, etc.), and/or communicate with any other type of device or server in any manner. Electronic device 200 can be, for example, a multi-touch hybrid device that has a display screen (like the iPhone™) or an innovative multi-touch hybrid device that does not have a display screen.

Electronic device 200 can comprise user interface component 202. User interface component 202 is shown in FIG. 2 as a multi-touch screen that can function as both an integrated display screen and user input device. User interface component 202 can generate various touch signals in response to different touch events. A touch event occurs when a pointing apparatus, such as a user's fingertip or stylus, is making physical contact with, disengages from or moves along user interface component 202. A more detailed discussion of such a multi-touch screen can be found, for example, in Hotelling et al., U.S. patent publication No. 2006/0097991, filed May 6, 2004, entitled "Multipoint Touchscreen," which is incorporated by reference herein in its entirety.

Touch events can differ depending on, for example, the type of motion made by the pointing apparatus, the relative location of the touch event and/or the relative timing of the touch event in relation to other touch events. In addition, user interface component 202 can be used for entry of, e.g., text messages via letter by letter handwriting recognition. In some embodiments, electronic device 200 can announce to the user which letter the user has written.

In some embodiments, electronic device 200 can include button 204, which can be used in conjunction with user interface component 202.

Accessory connector 206 is shown in FIG. 2 as physically and electrically coupling electronic device 200 and accessory device 208 together. Accessory device 208 can include, for example, speakers 210 and 212. Speakers 210 and 212 can enable the user to hear audio files that are played back using electronic device 200. In some embodiments, accessory device 208 can also include microphone 214. Microphone 214 can allow the user to provide voice commands to electronic device 200, have a telephone conversation, etc. Persons skilled in the art will appreciate that accessory device 208 can also be wirelessly coupled to electronic device 200.

Figure 3:
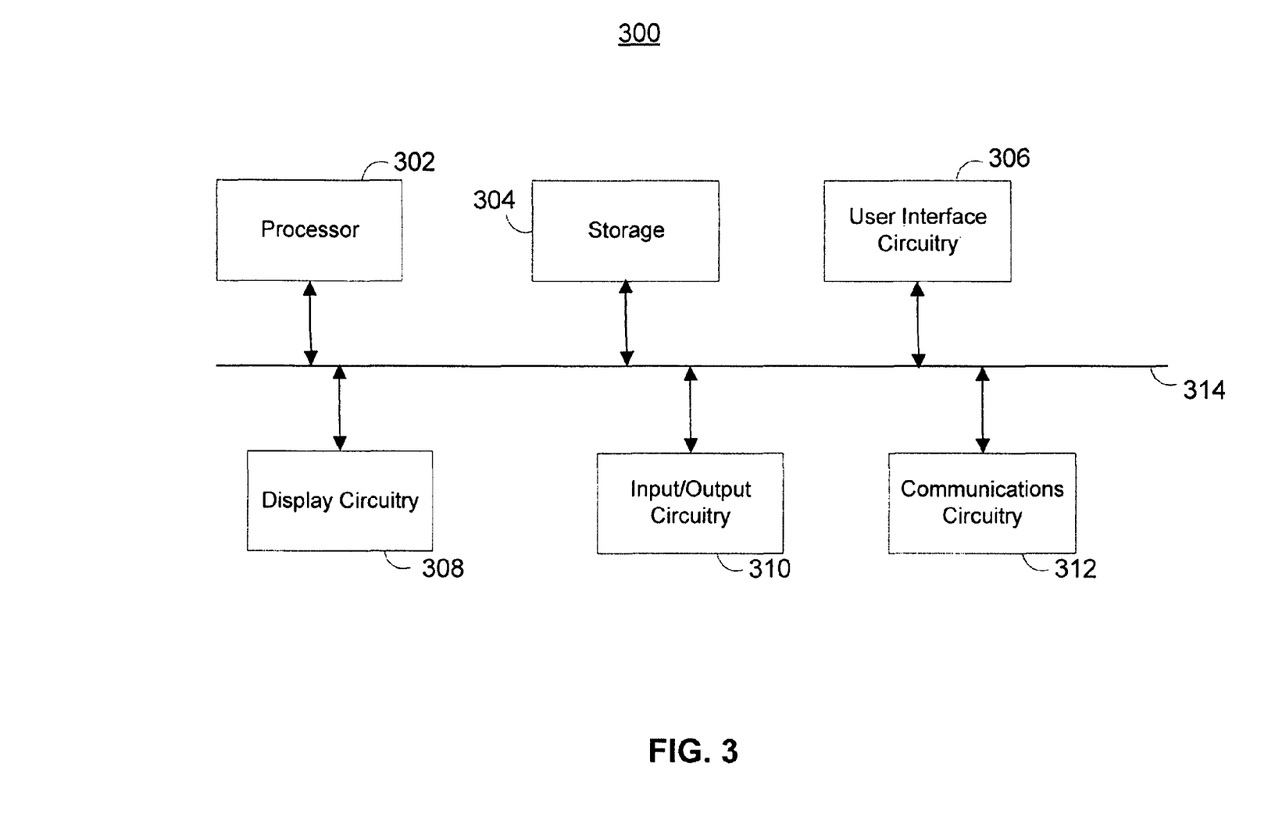
FIG. 3 shows a simplified block diagram of circuitry that can be included in an electronic device in accordance with one embodiment of the present invention.

FIG. 3 shows a simplified block diagram of circuitry that can be included in an electronic device in accordance with one embodiment of the present invention. Electronic device 300 can include, for example processor 302, storage 304, user interface circuitry 306, display circuitry 308, input/output circuitry 310, communications circuitry 312, and/or bus 314. In some embodiments, electronic device 300 can include more than one of each component, but for the sake of illustration, only one of each is shown in FIG. 3. In addition, one skilled in the art would appreciate that the functionality of certain components can be combined, interchanged, and/or omitted and that additional components, which are not shown in FIG. 3, could be included in electronic device 300. One skilled in the art will also appreciate that all of the components can be integrated into electronic device 300, or one or more of the components can be provided externally or remotely. Electronic device 300 could be implemented in or as any type of electronic device or devices, such as, for example electronic devices 100 and 200 discussed above.

Electronic device 300 can present media files to the user. For example, device 300 can be a dedicated media player (e.g., MP3 player), a game player, a remote controller, a portable communication device, a remote ordering interface, or other suitable personal device. In another embodiment, electronic device 300 can be a portable device focused on providing media playback, online access, and telephone functionality in single integrated unit.

Electronic device 300 can be battery-operated and highly portable so as to allow a user to listen to music, play games or video, record audio, video, and/or images, conduct telephone calls, communicate with other devices, control other devices, and any combination thereof. In addition, electronic device 300 can be sized such that it fits relatively easily into a pocket or hand of the user. By being handheld, electronic device 300 is relatively small and easily handled and utilized by its user, and thus can be taken practically anywhere the user travels.

Processor 302 can include, for example, circuitry for and be configured to perform any function. Processor 302 can be used to run operating system applications, media playback applications, media editing applications, and/or any other application. Processor 302 can drive display circuitry 308, and can receive user inputs from user interface circuitry 306, and can receive input to and drive output from input/output circuitry 310.

Storage 304 can include one or more different types of memory or storage mediums which can be used to facilitate and/or perform various device functions. For example, storage 304 can include cache, Flash, one or more different types of memory used for temporarily storing data, a hard-drive, tape drive, optical drive, permanent memory such as ROM, semi-permanent memory such as RAM, any other suitable type of storage component, or any combination thereof. Storage 304 can store, for example, media data (e.g., music and video files), application data (e.g., for implementing functions on device 300), firmware, preference information data (e.g., media playback preferences), lifestyle information data (e.g., food preferences), exercise information data (e.g., information obtained by exercise monitoring equipment), transaction information data (e.g., information such as credit card information), wireless connection information data (e.g., information that can enable device 300 to establish a wireless connection), subscription information data (e.g., information that keeps track of podcasts or television shows or other media a user subscribes to), contact information data (e.g., telephone numbers and email addresses), calendar information data, any other suitable data, or any combination thereof. Storage 304 can store programs or applications that can be run on processor 302, can maintain files formatted to be read and edited by one or more of the applications, and can store any additional files that can aid the operation of one or more applications (e.g., files with metadata). Storage 304 can be specifically dedicated to storing firmware. For example, storage 304 can be provided for storing firmware for device applications (e.g., operating system, user interface functions, and processor functions).

User interface circuitry 306 can convert user interactions into electrical signals that can be used by electronic device 300. For example, user interface circuitry 306 can receive various inputs from various input devices, such as at least a button, keypad, dial, a click wheel, touch screen or any combination thereof, and can generate data that can be used by electronic device 300.

Display circuitry 308 can be used to drive and/or present media information (textual and/or graphic) on a display component. Examples of displays that can be presented by the present invention are discussed in connection with, e.g., FIGS. 5-11. Display circuitry 308 can include a coder/decoder (CODEC) to encode/decode digital media data. Display circuitry 308 also can include display driver circuitry and/or circuitry for driving display driver(s). The display signals can be generated by processor 302 or display circuitry 308. The display signals can provide media information related to media data received from communications circuitry 312 and/or any other component of electronic device 300. In some embodiments, display circuitry 308, like any other component discussed herein, can be integrated with and/or externally coupled to electronic device 300.

Input/output circuitry 310 can convert (and encode/decode, if necessary) data, analog signals and other signals (e.g., physical contact inputs, physical movements, analog audio signals, etc.) into digital data, and vice-versa. The digital data can be provided to and received from processor 302, storage 304, or any other component of electronic device 300. Although input/output circuitry 310 is illustrated in FIG. 3 as a single component of electronic device 300, a plurality of input/output circuitry can be included in electronic device 300. Input/output circuitry 310 can be used to interface with any input or output component, such as those discussed in connection with FIGS. 1 and 2. For example, electronic device 300 can include specialized input circuitry associated with input devices such as, for example, one or more microphones, cameras, proximity sensors, accelerometers, ambient light detectors, etc. Electronic device 300 can also include specialized output circuitry associated with output devices such as, for example, one or more speakers, etc. User interface circuitry 306 and display circuitry 308 are specific examples of input/output circuitry 310.

Communications circuitry 312 can permit device 300 to communicate with one or more servers or other devices using any suitable communications protocol. For example, communications circuitry 312 can support Wi-Fi (e.g., a 802.11 protocol), Ethernet, Bluetooth™ (which is a trademark owned by Bluetooth Sig, Inc.), high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, any combination thereof, and/or any other type of communications protocol.

Figure 4:
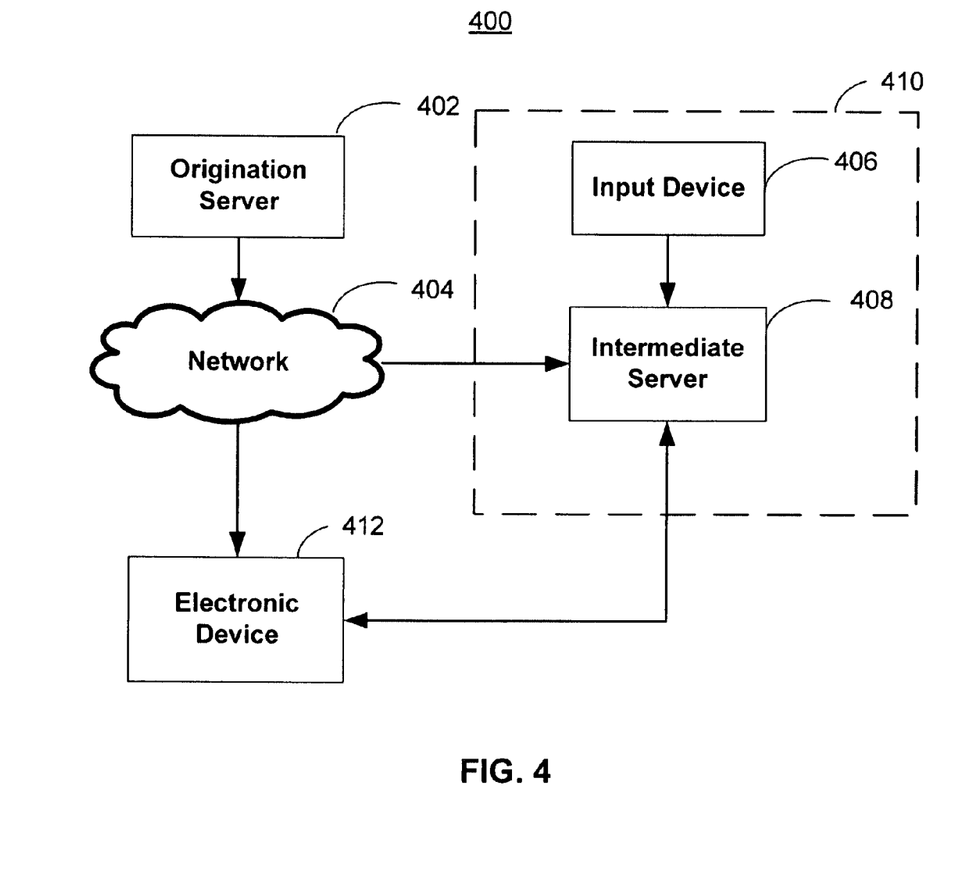
FIG. 4 shows a simplified block diagram of an illustrative data system that includes an electronic device in accordance with one embodiment of the present invention.

FIG. 4 shows a simplified block diagram of a data system that includes, among other things, an electronic device. More specifically, data system 400 includes origination server 402, network 404, input device 406, and intermediate server 408. Origination server 402 is any database that contains media data (e.g., media files) that the user may retrieve. For instance, origination server 402 can be an online music store such as Apple Inc.'s iTunes Music Store™, or even a CD, DVD, or any other storage device that contains media data that can be accessed by a remote device.

Network 404 can include one or more different types of networks which can be used to link servers and/or devices together. For example, network 404 can include cellular, Wi-Fi, Bluetooth, cable, any other type of wired or wireless network, or any combination thereof.

Intermediate server 408 can include a laptop or desktop computer, or any other electronic device that can download and subsequently upload data to one or more other devices. In some embodiments, intermediate server 408 can be combined with input device 406 (delimited by dashed line 410) to form a single device. Input device 406 can include one or more different types of input devices, such as, for example, keyboard, mouse, and microphone.

Electronic device 412 can be any type of electronic device, such as electronic devices 100 and 200. In some embodiments, network 404 can be used as a conduit to transfer one or more media files from origination server 402 to electronic device 412 or intermediate server 408. The metadata tags associated with these files can be added, deleted, and/or changed using intermediate server 408 or electronic device 412. Media files can be transferred in both directions between electronic device 412 and intermediate server 408. For example, media files along with their associated metadata tags can be downloaded from the intermediate server 408 to electronic device 412, and vice versa.

It will be understood that FIGS. 5 to 11 described below do not need to be provided to the user in the order presented. In other words, each of the display screens can be provided to the user without requiring the user to cycle through any other display screens.

Figure 5:
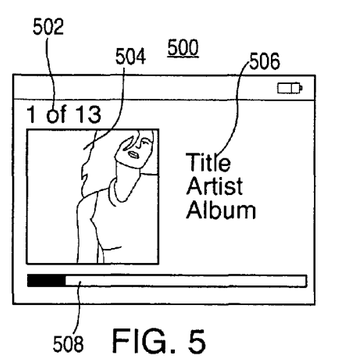
FIG. 5 shows a schematic view of an illustrative display screen for adjusting volume while playing a media file on an electronic device in accordance with one embodiment of the present invention.

FIG. 5 shows a schematic view of an illustrative display screen for adjusting volume while playing a media file on an electronic device in accordance with one embodiment of the present invention. The electronic device can be the same as similar to electronic devices 300 (FIG. 3) and 412 (FIG. 4).

Display screen 500 can be displayed when an electronic device is operating in the playing mode. For example, a user may select to play a media file by selecting a button (e.g., a center select button in user input component 104 of FIG. 1) or selecting a play option on a touch screen (e.g., user interface component 202 of FIG. 2). In some embodiments, the selected media file can be a member of a playlist. Playlists can be defined as a collection of one or more media files that can be organized in a particular order (e.g., alphabetically by title, artist, etc.). For example, a playlist can be defined by the user (e.g. "CLASSIC COUNTRY"). As another example, a playlist can include all the media files in the user's media library. As yet another example, a playlist can be predefined by the electronic device (e.g., songs in a music album or "My Top Rated" playlist).

Display screen 500 can include playlist information 502. For example, as displayed in FIG. 5, the media file that is currently playing is the first media file out of a total of thirteen media files. In some embodiments, when the electronic device begins to play the second song in the playlist, playlist information 502 can be automatically updated. For example, the electronic device can display "2 of 13" in playlist information 502.

Display screen 500 can include graphic 504, which can be a graphic image that is associated with the media file. For example, graphic 504 can be the album art from an album that features the media file. The user may use any suitable graphic image (e.g., still or animated) for graphic 504. In some embodiments, the electronic device can automatically download graphic 504 from a server (e.g., origination server 402 or intermediate server 408). For example, based on the media file's album, the electronic device can search for album art that is associated with the album. The electronic device can then download the album art as graphic 504. In some embodiments, graphic 504 may have previously been linked to the media file (e.g. in a markup language file such as XML), so that as soon as the user adds the media file to the media library, graphic 504 is automatically added as well.

Display screen 500 can also include media file information 506. For example, media file information 506 for a song can include the song's title, artist, and album. Media file information 506 can be associated with a media file using one or more metadata tags, which can allow the media files to be easily sorted based on the metadata tags. Persons skilled in the art will appreciate that graphic 504 and any other suitable information can also be associated with a media file using metadata tags.

Display screen 500 can also include volume bar 508. Volume bar 508 can be a slider bar that displays the current volume (in fact, volume bar 508 is displayed as a slider bar in FIG. 5). Any suitable representation of the current volume can be used, such as, for example, a numerical display that shows volume as a percentage. The user may adjust the volume by moving a finger around a click wheel (e.g., user input component 104 of FIG. 1) or directly sliding a finger across volume bar 508 (e.g., sliding left to decrease volume and sliding right to increase volume).

In some embodiments, in response to the user issuing a particular command, the electronic device can display a progress bar associated with the currently playing media file.

For example, the user may press a center select button in a user input component (e.g., user input component 104 of FIG. 1) or select an option using a touch screen (e.g., user interface component 202 of FIG. 2).

Figure 6:
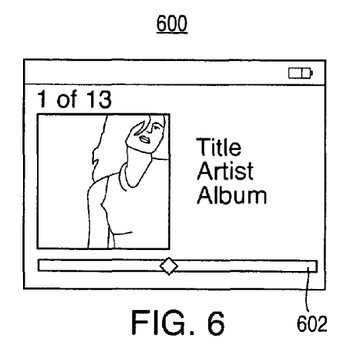
FIG. 6 shows a schematic view of an illustrative display screen for adjusting current playing progress in a media file in accordance with one embodiment of the present invention.

FIG. 6 shows a schematic view of an illustrative display screen for adjusting playing progress in a media file in accordance with one embodiment of the present invention. Display screen 600 can include progress bar 602. Progress bar 602 can display the playing progress of the media file. For example, as illustrated in FIG. 6, the playing progress is close to the middle of the media file. In some embodiments, progress bar 602 can be a slider bar (as shown in FIG. 6). Persons skilled in the art will appreciate that any suitable representation of the playing progress can be used, such as, for example, a numerical display that shows the playing progress as a vertical bar or as a percentage.

The user may adjust the playing progress by moving a finger around a click wheel (e.g., user input component 104) or directly sliding a finger across progress bar 602 (e.g., sliding left to rewind the media file and sliding right to fast forward the media file). In response to the user selecting to adjust the playing progress, the electronic device can automatically begin to play the media file from the new position in the media file.

In some embodiments, in response to the user issuing a particular command, the electronic device can display ratings that are associated with the currently playing media file. For example, the user may press a center select button in a user input component (e.g., user input component 104) or select an option using a touch screen (e.g., user interface component 202).

Figure 7:
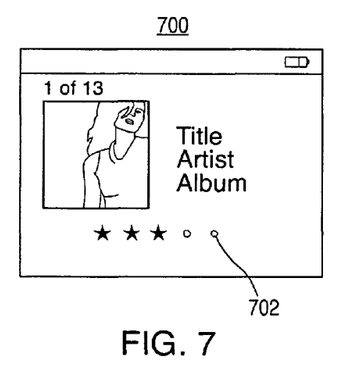
FIG. 7 shows a schematic view of an illustrative display screen for adjusting a media file's star rating in accordance with one embodiment of the present invention.

FIG. 7 shows a schematic view of an illustrative display screen for adjusting a media file's star rating in accordance with one embodiment of the present invention. Display screen 700 can include star rating 702, which can indicate the current rating of the media file. In some embodiments, star rating 702 can be assigned by the user and can range from one star (lowest rating) to five stars (highest rating). For example, as shown in FIG. 7, the star rating for the currently playing media file is three stars. The user may adjust the star rating by moving a finger around a click wheel (e.g., user input component 104) or directly sliding a finger across star rating 702 (e.g., sliding left to decrease the rating and sliding right to increase the rating).

Similar to media file information 506, the electronic device can associate star ratings to media files using metadata tags. In some embodiments, based on the star ratings of the media files in the user's media library, the electronic device can automatically create a "My Top Rated" playlist that includes the highest rated songs. In addition, when the user associates a five stars rating to a new song, the electronic device can automatically add the new song to the "My Top Rated" playlist.

In some embodiments, in response to the user issuing a particular command, the electronic device can display a graphic image that is associated with the currently playing media file. For example, the user may press a center select button in a user input component (e.g., user input component 104) or select an option using a touch screen (e.g., user interface component 202).

Figure 8:
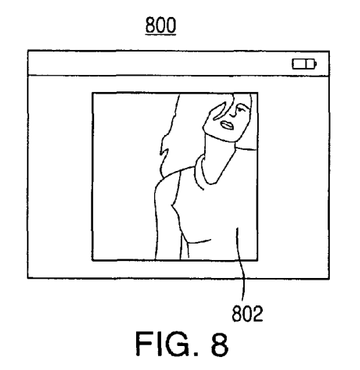
FIG. 8 shows a schematic view of an illustrative display screen for displaying a graphic image representing a media file in accordance with one embodiment of the present invention.

FIG. 8 shows a schematic view of an illustrative display screen for displaying a graphic image representing a media file in accordance with one embodiment of the present invention. Display screen 800 can include graphic 802. Graphic 802 can be similar to graphic 504 of FIG. 5 (e.g., album art or graphic image that is linked to the currently playing media file). For example, graphic 802 can be a larger version of graphic 504.

In some embodiments, the user may select graphic 504 on a touch screen (e.g., user interface component 202) to change the graphic. For example, in response to the user selecting graphic 504, the electronic device can provide options for the user to replace graphic 504 with a different graphic (e.g., the electronic device can provide graphics stored on the electronic device, one or more local servers, one or more remote servers, or any combination thereof). As another example, in response to the user selecting graphic 504, the electronic device can provide options for the user to edit the graphic. The user may perform any suitable editing operation, such as, for example, enlarging, shrinking, and cropping.

In some embodiments, in response to the user issuing a particular command, the electronic device can display one or more shuffle options that are associated with the currently playing media file. For example, the user may press a center select button in a user input component (e.g., user input component 104) or select an option using a touch screen (e.g., user interface component 202).

In some embodiments, in response to the user selecting a shuffle option (e.g., shuffle options 906, 908, and 910 in FIGS. 9-11), the electronic device can create a new playlist while simultaneously keeping the current media file playing. In some embodiments, the electronic device can add the media file as the first media file in the new playlist. Because the electronic device can keep track of the progress of the media file, the media file can play without interruptions. After the electronic device finishes playing the media file, the electronic device can begin to play the second media file in the new playlist.

In some embodiments, the electronic device can create a new playlist without adding the current media file as the first media file in the new playlist. As a result, the electronic device can finish playing the current media file, and can then proceed to play the first media file in the new playlist.

In some embodiments, in response to the user continuously selecting among the multiple shuffle options, the electronic device can shuffle the playlist based on the shuffle characteristics defined for each shuffle option. Even in this continuous selecting mode, the electronic device can continue to play the current media file without interruptions.

Figure 9:
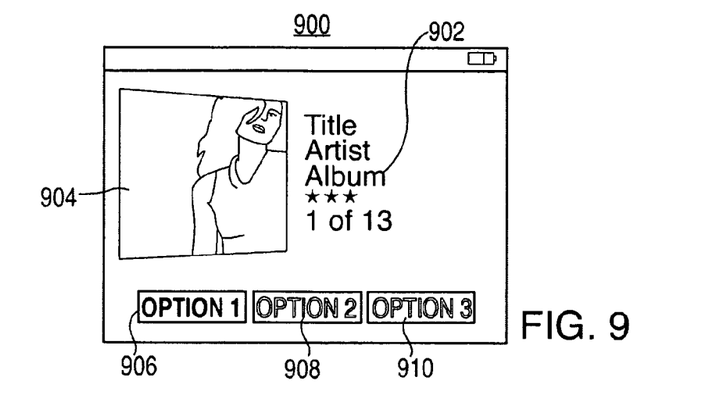
FIG. 9 shows a schematic view of an illustrative display screen in which a first shuffle option can be selected while playing a media file in accordance with one embodiment of the present invention.

FIG. 9 shows a schematic view of an illustrative display screen in which a first shuffle option can be selected while playing a media file in accordance with one embodiment of the present invention. Display screen 900 can include media file information 902, which can include relevant information that is associated with the media file. Media file information 902 can include playlist information 502 (FIG. 5) and media file information 506 (FIG. 5). For example, media file information 902 can include title, artist, album, rating, track information, and any other suitable information that is associated with the media file.

Display screen 900 can include graphic 904, which can be a graphic image that is associated with the media file. In some embodiments, graphic 904 can be similar to graphics 504 (FIG. 5) and 802 (FIG. 8).

Display screen 900 can include shuffle option 906. In some embodiments, the user may select shuffle option 906 by moving a finger around a click wheel (e.g., user input component 104 of FIG. 1). After the user adjusts the click wheel so that shuffle option 906 is highlighted (as displayed in FIG. 9), the user may press a center select button in user input component (e.g., user input component 104 of FIG. 1) to select shuffle option 906. In some embodiments, the user may directly select shuffle option 906 on a touch screen (e.g., user interface component 202 of FIG. 2).

In some embodiments, in response to the user selecting shuffle option 906, the electronic device can sort the media files in the current playlist based on a parameter. For example, if the playlist is currently operating in a "shuffle" mode (e.g., the media files in the playlist are playing in a random order), the electronic device can unshuffle the playlist by sorting the media files based on the parameter. The parameter can include one or more metadata tags associated with the media files. Persons skilled in the art will appreciate that any suitable metadata tags can be used, including, for example, titles, artists, album names, dates when the media files were created, and dates when the media files were last modified.

The electronic device can organize the sorted media files as a new playlist. For example, the electronic device can create a new playlist that includes media files that are organized alphabetically based on the titles of the media files.

In some embodiments, in response to the user selecting shuffle option 906, the electronic device can display metadata tag options on a display screen (e.g., display component 102 of FIG. 1 or user interface component 202 of FIG. 2). In response to the user selecting one or more metadata tag options, the electronic device can use the selected metadata tag(s) to sort the media files. For example, the electronic device can sort the media files based on titles. As another example, the user may rank the one or more metadata tags based on decreasing priority. After the user has ranked the metadata tags, the electronic device can sort the media files based on higher ranked metadata tags before lower ranked metadata tags. In addition, for each metadata tag option, the electronic device can also provide options for the user to specify whether to sort the media files in ascending or descending order.

In some embodiments, if the playlist is currently operating in a "non-shuffle" mode (e.g., the media files in the playlist are already sorted based on a parameter), the electronic device may not change the current playlist in response to the user selecting shuffle option 906.

Figure 10:
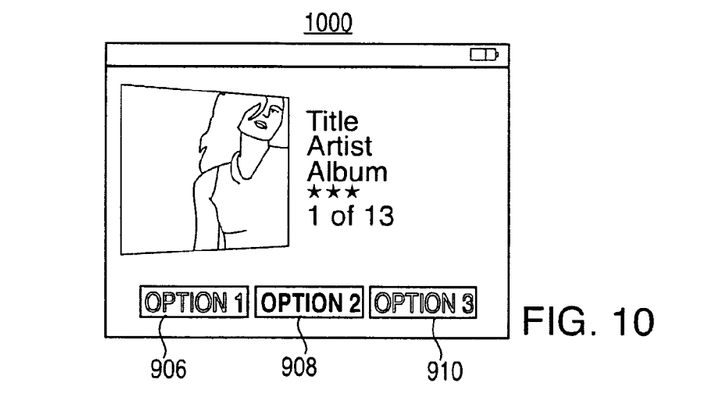
FIG. 10 shows a schematic view of an illustrative display screen in which a second shuffle option can be selected while playing a media file in accordance with one embodiment of the present invention.

FIG. 10 shows a schematic view of an illustrative display screen in which a second shuffle option can be selected while playing a media file in accordance with one embodiment of the present invention. In some embodiments, the user may select shuffle option 908 by moving a finger around a click wheel (e.g., user input component 104). After the user adjusts the click wheel so that shuffle option 908 is highlighted (as shown in FIG. 10), the user may press a center select button in user input component (e.g., user input component 104) to select shuffle option 908. In some embodiments, the user may directly select shuffle option 908 on a touch screen (e.g., user interface component 202).

In response to the user selecting shuffle option 908, the electronic device can shuffle the media files in the current playlist. For example, the electronic device can shuffle the media files by creating a random ordering of the media files in the current playlist. A random ordering can include any ordering of the media files that lack a distinct pattern. Persons skilled in the art will appreciate that a random ordering can include pseudo-random ordering or apparently random ordering. Various algorithms can be used to create a random ordering, such as, for example, a linear congruential generator, a middle square method, or a computational algorithm that is initialized by a seed.

After shuffling the media files, the electronic device can create a new playlist from the shuffled media files.

Figure 11:
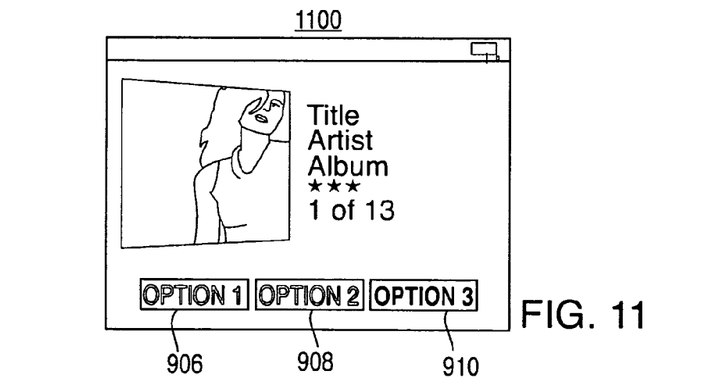
FIG. 11 shows a schematic view of an illustrative display screen in which a third shuffle option can be selected while playing a media file in accordance with one embodiment of the present invention.

FIG. 11 shows a schematic view of an illustrative display screen in which a third shuffle option can be selected while playing a media file in accordance with one embodiment of the present invention. In some embodiments, the user may select shuffle option 910 by moving a finger around a click wheel (e.g., user input component 104). After the user adjusts the click wheel so that shuffle option 910 is highlighted (as shown in FIG. 11), the user may press a center select button in user input component (e.g., user input component 104) to select shuffle option 910. In some embodiments, the user may directly select shuffle option 910 on a touch screen (e.g., user interface component 202).

In response to the user selecting shuffle option 910, the electronic device can create a new playlist such that the media files are sorted and shuffled. In some embodiments, the electronic device can first sort the media files into groups based on a parameter before shuffling. The parameter can include any suitable metadata tags that are associated with the media files, such as, for example, albums, titles, star ratings, artists, and genre.

In some embodiments, after sorting the media files into groups of media files, the electronic device can shuffle the media files within each group. The electronic device can then create a new playlist such that the shuffled media files from the same group are kept together.

In some embodiments, after sorting the media files into groups of media files based on the parameter, the electronic device can shuffle the groups. The electronic device can then create a new playlist such that the groups are in a random order, but the media files within each group are sorted. These two types of shuffling are discussed in more detail in connection with FIG. 12.

Figure 12:
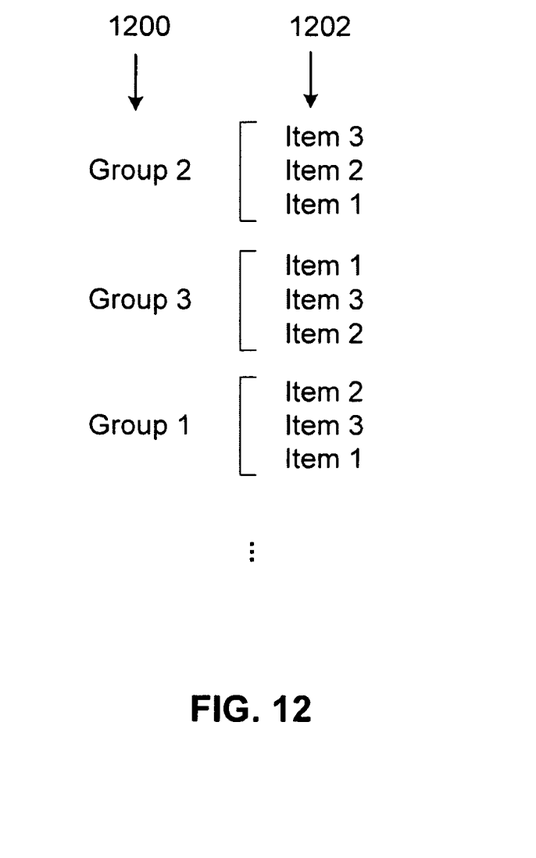
FIG. 12 shows an approach to creating a new playlist by sorting and shuffling an existing playlist in accordance with one embodiment of the present invention.

FIG. 12 shows an approach to creating a new playlist by sorting and shuffling an existing playlist in accordance with one embodiment of the present invention. First layer 1200 can include media file groups (e.g., media file groups 1, 2, and 3). The media file groups can be shuffled (as shown in FIG. 12) or unshuffled. In addition, second layer 1202 can include media files (e.g., items 1, 2, and 3). Each media file can include a metadata tag that links the media file to a corresponding media file group. As shown in FIG. 12, the electronic device can sort the media files based on each file's media file group. In response to a user selecting a shuffle option (e.g. shuffle option 910 of FIGS. 9-11), the media files can be shuffled within each media file group. A new playlist can then be formed by combining layers 1 and 2. For example, the electronic device can organize the new playlist so that the media files in group 2 are listed first, then the media files in group 3, and finally the media files in group 1.

In some embodiments, the electronic device can sort the media files by using a parameter that includes multiple metadata tags. As discussed previously, the electronic device can rank the metadata tags based on decreasing priority. For example, if albums have a higher priority than star ratings, the electronic device can first sort media files based on albums and can then sort the media files based on star ratings. After the media files have been sorted, the electronic device can shuffle media files that belong to the same album and have the same star rating.

As discussed previously, the electronic device can also shuffle the media file groups but maintain the media files in a particular order within each media file group. For example, the media files within each media file group can be sorted based on a parameter (e.g., by track number). In response to a user selecting a shuffle option (e.g., shuffle option 910), the electronic device can organize a new playlist such that the media file groups are shuffled, but the media files within each group are sorted based on the parameter. For example, the electronic device can shuffle the albums, but preserve the track order of the songs in each album.

In some embodiments, the electronic device can sort the playlist based on the context of the media file that is currently playing. For example, the electronic device can select a metadata tag that is associated with a song that is currently playing. The electronic device can then sort the playlist so that songs that have the same metadata tag can be placed immediately after the song. As a result, these songs will share some context (e.g., at least one metadata tag) with the song that is currently playing. For example, in a music player scenario, if the user selects shuffle option 910 while listening to a Smashing Pumpkins song, the system can generate a new playlist using genre (e.g., alternative music) as a grouping criteria. The electronic device can then find other songs that are similar to the Smashing Pumpkins song. In this particular example, the electronic device can add genre of media files as a parameter that is associated with the shuffle command.

In some embodiments, the electronic device can create a playlist that includes mixed media types (e.g., movies, songs, and audiobooks). For example, the user can select shuffle option 910 while watching a movie on an electronic device. The device can then look for other movies or movie clips that have the same actors, director, or year as the currently playing movie. In addition, the electronic device can look for songs from the movie soundtrack to add to the playlist.

The electronic device can also use information gathered from a network to create a new playlist. A network search, for example, can reveal other users that have similar preferences as the user, which can help generate playlists based on the preferences of those users. For example, other users may have created playlists that include media files that are the same as or similar to some of the media files in the user's media library. The electronic device can use this information to automatically create playlists for the user.

As discussed previously, the electronic device can sort the playlist based on the context of the media file that is currently playing. In addition, the electronic device can also sort the playlist based on the context of media files that have been played recently. For example, if the last five songs that the user has listened to are all from the 1980's, then the electronic device can automatically generate a playlist containing other songs from the 1980's. As another example, by analyzing the audio signals of recently played songs, the electronic device can determine that the user has already listened to five songs that have slow tempos. The electronic device can then generate a new playlist that includes other songs that have slow tempos.

Figure 13A:
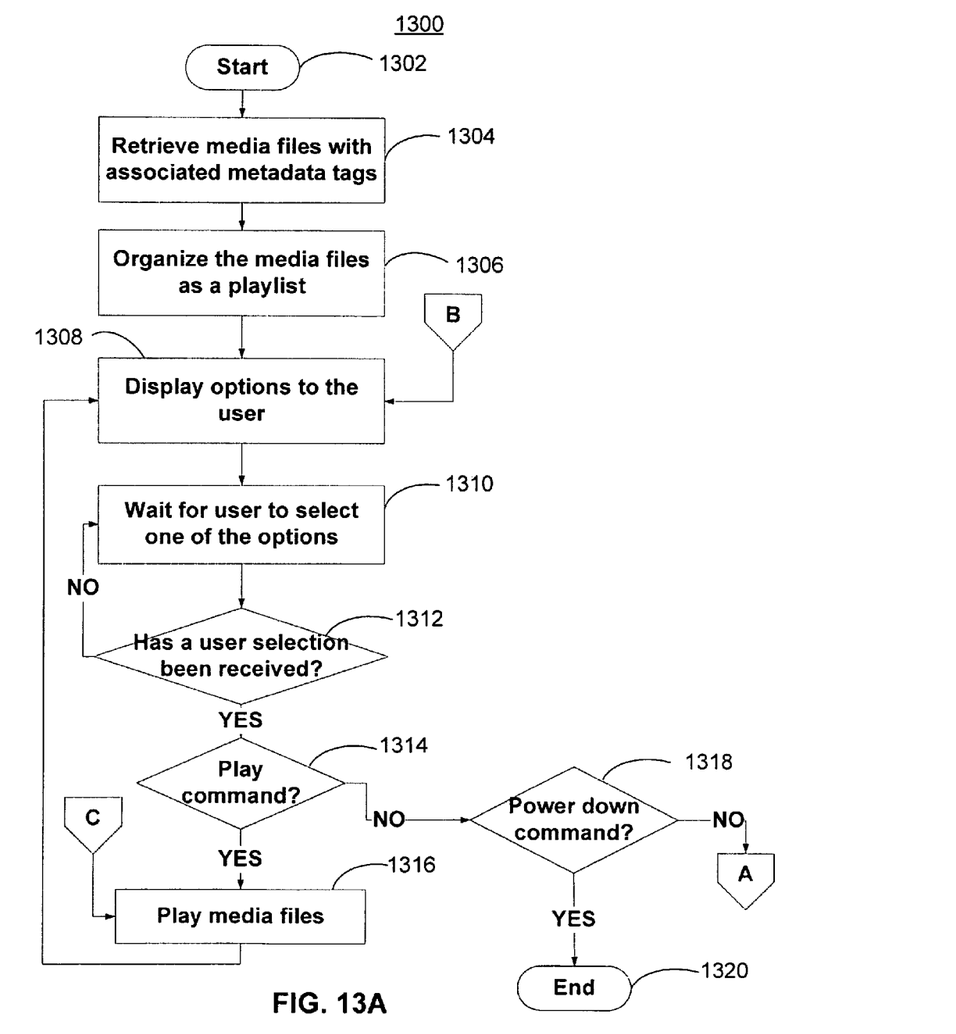
FIGS. 13A-13B show flowcharts of exemplary methods of operation of an electronic device in accordance with one embodiment of the present invention.
Figure 13B:
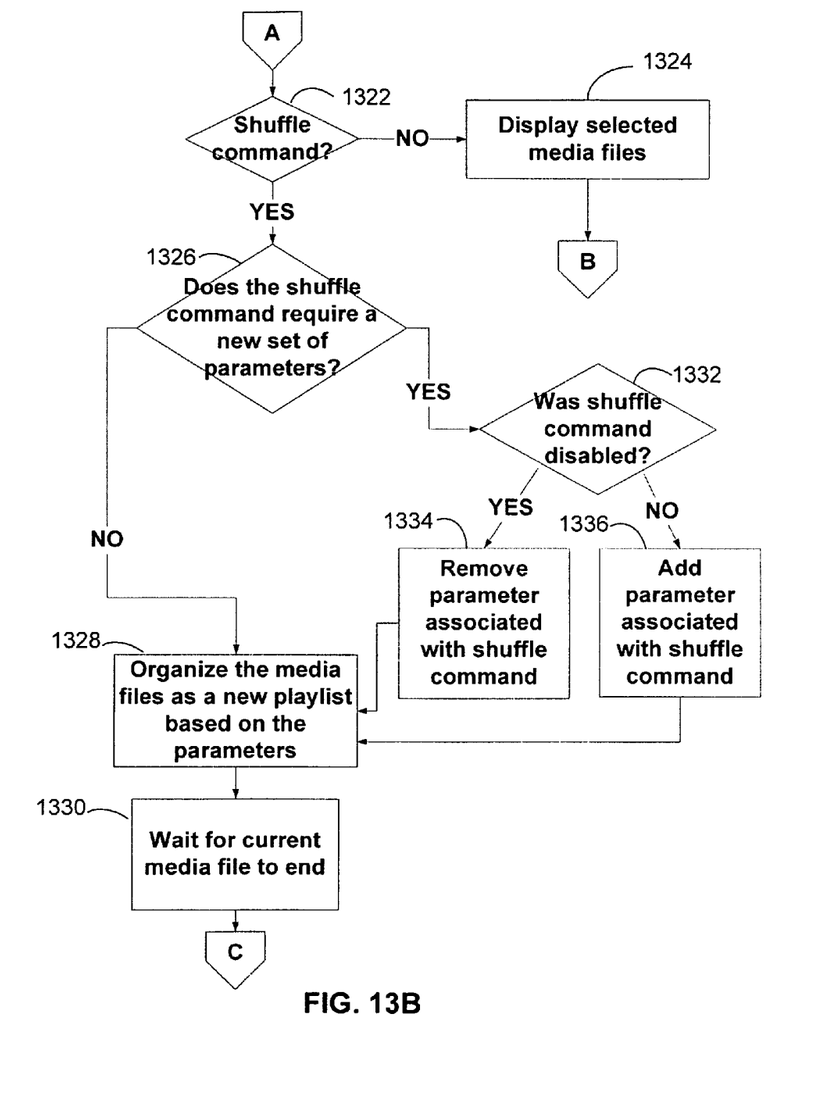

FIGS. 13A-13B show flowcharts of exemplary methods of operation of an electronic device in accordance with one embodiment of the present invention. Process 1300 starts at step 1302. At step 1304, an electronic device can retrieve one or more media files with associated metadata tags from another source (such as origination server 402 or intermediate server 408 in FIG. 4).

At step 1306, the electronic device can organize the media files as a playlist. The playlist can be defined by the user or the electronic device (e.g., songs in a music album or "My Top Rated" playlist). After organizing the media files, process 1300 moves to step 1308.

At step 1308, the electronic device can display one or more options. Suitable options can include, for example, displaying a playlist, shuffling and/or sorting media files in a playlist, shuffling and/or sorting one or more groups of media files in a playlist, playing a playlist, or any combination thereof.

Options can be associated with one or more commands that can be executed by the electronic device. In some embodiments, in response to a display command, the electronic device can filter the media files based on one or more metadata tags. For example, in response to the user selecting to display songs from an album, the electronic device can filter and display songs that are from the selected album. It will be understood that commands associated with options can generally be nested, which means that when a user selects an option, the electronic device can execute more than one command. In addition, when the user selects a certain option, several different commands can be invoked simultaneously. For example, when the user selects to display a playlist, the electronic device can execute a display command by generating and presenting a display. When the user then selects to play the media files in the playlist, this play command is executed in response to the options selected previously and in conjunction with the display command. After displaying the options, process 1300 moves to step 1310.

At step 1310, the electronic device can wait for the user to select one of the options. At step 1312, the electronic device can determine whether it has received a selection from the user to execute one of the commands. If, at step 1312, the electronic device determines that the user has not selected an option, process 1300 moves back to step 1310, where the electronic device continues to wait for the user to select one of the options. If, at step 1312, the electronic device instead determines that the user has selected an option, process 1300 moves to step 1314.

At step 1314, the electronic device can determine whether the selected option is associated with a play command. If, at step 1314, the electronic device determines that the user has selected a play option, process 1300 moves to step 1316.

At step 1316, the electronic device can play the media files that are in the playlist. Process 1300 then moves back to step 1308. At step 1308, the electronic device can display more options to the user. For example, the electronic device can display shuffle options 906, 908, and 910 (FIGS. 9-11).

If, at step 1314, the electronic device instead determines that the user has not selected a play option, process 1300 moves to step 1316.

At step 1318, the electronic device can determine whether the option is associated with a power down command. If, at step 1318, the electronic device determines that the option is associated with a power down command, process 1300 ends at step 1320. If, at step 1318, the electronic device instead determines that the option is not associated with a power down command, process 1300 moves to step 1322.

At step 1322, the electronic device can determine whether the selected option is associated with a shuffle command. If, at step 1322, the electronic device determines that the selected option is not associated with a shuffle command, process 1300 moves to step 1324.

At step 1324, the electronic device can display the selected media files. For example, the user may have requested to view songs from a music album. The electronic device can display the selected media files while continuing to play media files in the playlist. After displaying the selected media files, process 1300 moves back to step 1308, as discussed previously.

If, at step 1322, the electronic device instead determines that the selected option is associated with a shuffle command, process 1300 moves to step 1326. At step 1326, the electronic device can determine whether the shuffle command requires a new set of parameters. The parameters can include any suitable parameters that can be used to organize media files into playlists. For example, parameters can include names of media files, names of artists, lengths of the media files, dates that the media files were last modified, any other suitable metadata tags, or any other suitable parameters that can be associated with the shuffle command.

If, at step 1326, the electronic device determines that the shuffle command does not require a new set of parameters, process 1300 then proceeds to step 1328. At step 1328, the electronic device can organize the media files as a new playlist based on the parameters associated with the shuffle command. For example, in response to the user selecting shuffle option 908 (FIGS. 9-11), the electronic device can organize a new playlist by shuffling the media files. The electronic device can add the currently playing media file as the first media file in the new playlist. After shuffling the playlist, process 1300 moves to step 1330.

At step 1330, the electronic device can wait for the current media file to end. After the current media file has finished playing, process 1300 moves back to step 1316. At step 1316, the electronic device can play media files from the new playlist.

If, at step 1326, the electronic device instead determines that the shuffle command requires a new set of parameters, process 1300 moves to step 1332. At step 1332, the electronic device can determine if the shuffle command has been disabled. If, at step 1332, the electronic device determines that the shuffle command has been disabled, process 1300 moves to step 1334.

At step 1334, the electronic device can remove a parameter associated with the shuffle command. For example, the electronic device can remove the shuffle parameter. After removing the shuffle parameter, process 1300 moves to step 1328.

At step 1328, the electronic device can organize the media files as a new playlist based on the parameters. For example, in response to the user selecting shuffle option 906 (FIGS. 9-11), the electronic device can unshuffle the playlist and sort the media files in the playlist based on a parameter (e.g., sort the media files alphabetically by title, year, artist, or any combination thereof). The electronic device can then create the new playlist from the sorted media files. After creating the new playlist, process 1300 moves to step 1330.

If, at step 1332, the electronic device determines that the shuffle command has not been disabled, process 1300 moves to step 1336. At step 1336, the electronic device can add a parameter associated with the shuffle command. This parameter can be, for example, at least one metadata tag that the electronic device can use to play media file(s). After adding the parameter, process 1300 moves to step 1328.

At step 1328, the electronic device can organize the media files as a new playlist based on the parameters. For example, in response to the user selecting shuffle option 910 (FIGS. 9-11), the electronic device can first sort the playlist of media files into groups based on a parameter (e.g., albums). The electronic device can then shuffle the media files within each group. For example, the electronic device can shuffle the playlist based on the approach shown in FIG. 12.

Thus it is seen that systems, methods and computer readable media are provided for performing dynamic randomization of a playlist by allowing the currently playing media file to continue playing when a shuffle option is selected. One skilled in the art will appreciate that the invention can be practiced by other than the described embodiments, which are presented for purposes of illustration and not of limitation, and the present invention is limited only by the claims which follow.

What is claimed is:

1. A method of generating playlists using an electronic device, comprising:
   retrieving a plurality of songs from a storage medium;
   organizing the plurality of songs as a first playlist;
   playing a song included in the first play list;
   examining metadata tags associated with the songs in the plurality of songs;
   presenting to a user a plurality of ranking options to specify a ranking order for what metadata tags are to be used to sort the plurality of songs;
   in response to the user selecting a first ranking option of the plurality of ranking options, re-organizing the plurality of songs as a second playlist while keeping the song playing, and wherein the song that is currently playing is the first song in the second playlist, and wherein the re-organizing comprises:
      sorting the plurality of songs into at least two groups of songs based on a highest ranking metadata tag such that the songs of each group of the at least two groups has a same parameter value for the first parameter;
      sorting the songs in the at least two groups of songs based on a next-highest ranking metadata tag;
      iteratively sorting the plurality of songs within each group and sub-group into further sub-groups based on a sequentially ranked metadata tags; and
      executing a shuffle command re-organizing the plurality of songs within each group while keeping the currently playing song playing.

2. The method of claim 1, wherein the sorting comprises sorting the plurality of songs based on the song that is currently playing so that the one or more songs that immediately follow the song share at least one metadata tag with the song.

3. The method of claim 1 further comprising:
   playing in a random order songs included in the second playlist that have the same parameter value before playing any song included in the second playlist that has a different parameter value.

4. The method of claim 1 further comprising:
   shuffling the at least two groups of songs.

5. The method of claim 1 further comprising:
   shuffling the one or more plurality of songs.

6. The method of claim 1, wherein the first parameter comprises at least one metadata tag associated with titles, albums, artists, genre, or any combination thereof.

7. The method of claim 6 further comprising:
   ranking the at least one metadata tag based on decreasing priority; and
   sorting the plurality of songs using at least one of the ranked metadata tags.

8. An apparatus that generates playlists of songs, comprising:
   a storage medium that stores songs;
   a display screen;
   a user input component that accepts user inputs; and
   a processor configured to:
      examine metadata tags associated with the songs;
      generate a display that is presented on the display screen, wherein the display includes an option;
      in response to a user selecting the option, organize the songs as a first playlist;
      play a song included in the first playlist;
      generate a display comprising a plurality of playlist organization options that are presented on the display screen while playing the song, wherein the song continues to play in response to selection of one of the plurality of playlist organization options, and wherein the plurality of playlist organization options comprise a first option, a second option, and a plurality of ranking options to specify a ranking order for what metadata tags are to be used to sort the plurality of songs;

in response to the user selecting the first option, re-organize the songs as a second playlist by randomly re-ordering the songs of the first playlist; and in response to the user selecting the second option, re-organize the songs as the second playlist by:

sorting the plurality of songs into at least two groups of songs based on a highest ranking metadata tag such that the songs of each group of the at least two groups has a same parameter value for the first parameter;

sorting the songs in the at least two groups of songs based on a next-highest ranking metadata tag; and iteratively sorting the plurality of songs within each group and sub-group into further sub-groups based on a sequentially ranked metadata tags.

9. The apparatus of claim 8, wherein the processor is further configured to:

shuffle songs within each group of the at least two groups of songs.

10. The apparatus of claim 9, wherein the processor is further configured to:

play in a random order songs included in the second playlist that have the same parameter value of the parameter before playing any song included in the second playlist that has a different parameter value of the parameter.

11. The apparatus of claim 9, wherein the processor is further configured to:

shuffle the at least two groups of songs.

12. The apparatus of claim 9, wherein the processor is further configured to:

shuffle the songs.

13. The apparatus of claim 9, wherein the parameter comprises at least two metadata tags associated with titles, albums, artists, genre, or any combination thereof.

14. The apparatus of claim 13, wherein the processor is further configured to:

rank the at least two metadata tags based on decreasing priority; and sort the songs using at least one of the ranked metadata tags.

* * * * *